United States Patent
Murray et al.

[11] Patent Number: 5,993,133
[45] Date of Patent: Nov. 30, 1999

[54] RETRACTABLE SPARE TIRE CARRIER

[76] Inventors: W. B. Murray, deceased, late of Canon City, Colo.; by Theresa Hoffman, executor, 0020 Dagget La., Gypsum, Colo. 81637

[21] Appl. No.: 08/702,261

[22] Filed: Aug. 23, 1996

[51] Int. Cl.⁶ .................................................. B62D 43/00
[52] U.S. Cl. ...................... 414/463; 414/465; 414/466; 414/919; 414/917; 224/42.12; 224/42.21; 224/42.23; 224/42.24
[58] Field of Search ..................... 414/463, 465, 414/466, 919, 917; 224/42.12, 42.21, 42.23, 42.24, 42.29

[56] References Cited

U.S. PATENT DOCUMENTS

| | | | |
|---|---|---|---|
| 1,623,377 | 4/1927 | Bacon | 414/463 |
| 1,879,304 | 9/1932 | Kennedy et al. | 414/463 |
| 3,187,914 | 6/1965 | Peras | 414/463 |
| 3,223,263 | 12/1965 | Fielding | 414/466 |
| 3,435,971 | 4/1969 | Powell | 224/42.23 |
| 3,862,696 | 1/1975 | McCauley et al. | 414/466 |
| 4,278,191 | 7/1981 | Mecham | 224/42.21 |
| 4,312,620 | 1/1982 | Muschalek, Jr. | 414/466 |
| 4,329,107 | 5/1982 | Smith | 224/42.23 |
| 4,492,506 | 1/1985 | Hoagland | 224/42.21 |
| 4,522,325 | 6/1985 | McMillian | 224/42.23 |
| 4,535,973 | 8/1985 | Dorr et al. | 254/323 |
| 4,711,382 | 12/1987 | Helterbrand | 224/42.12 |
| 4,795,302 | 1/1989 | Dalton | 414/463 |
| 4,884,729 | 12/1989 | Barkouskie | 414/466 |
| 4,964,552 | 10/1990 | Terwilliger | 224/42.21 |
| 4,976,384 | 12/1990 | Daniels | 224/42.21 |
| 5,197,641 | 3/1993 | Montgomery | 224/42.21 |
| 5,251,876 | 10/1993 | Stallings | 414/463 |
| 5,297,913 | 3/1994 | Fernando et al. | 224/42.21 |
| 5,449,031 | 9/1995 | Burkland | 414/463 |

*Primary Examiner*—Karen B. Merritt
*Assistant Examiner*—Douglas Hess

[57] ABSTRACT

An apparatus designed to carry a spare tire against the underside of a vehicle, rearwardly thereof, featuring a mounting plate, for the tire assembly, attached to the first end of a cantilever arm. The second end of the cantilever arm is pivotally attached to a carrier base frame, which in turn is pivotally suspended from support members attached to the vehicle's frame, by four suspension bars. Movement of the base frame is controlled by operation of a driver tube incorporated into the base frame, comprised of a rectangular tube, inside of which are a drive screw, and a rectangular nut. Two cables attached to the nut are directed by pulleys to the center of the back transverse member of the frame, then right and left to the two back corners, thense to a point on each longitudinal member of the frame, then vertically to anchor points on the support members attached to the vehicle's frame. Clockwise rotation of the screw pulls cable into the tube, moving the base frame forward and upward into storage position. Counter-clockwise rotation pays out cable moving the frame downward and backward to its lowest position, and even with the rearmost part of the vehicle. At this point, the cantilever arm is moved horizontally for the fullest extension of the carrier.

5 Claims, 13 Drawing Sheets

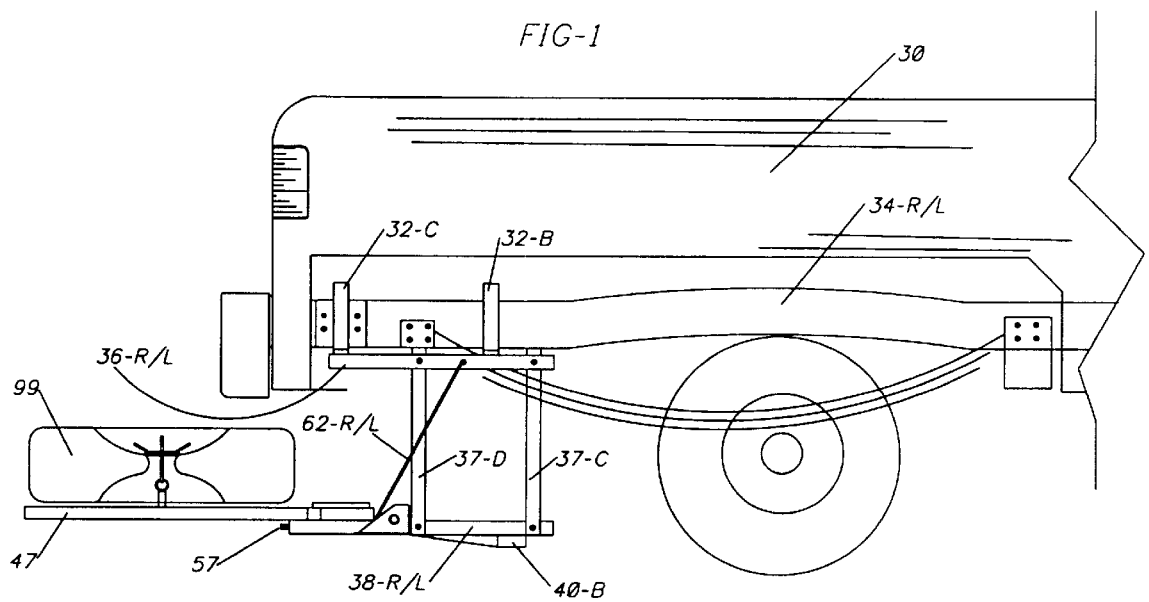
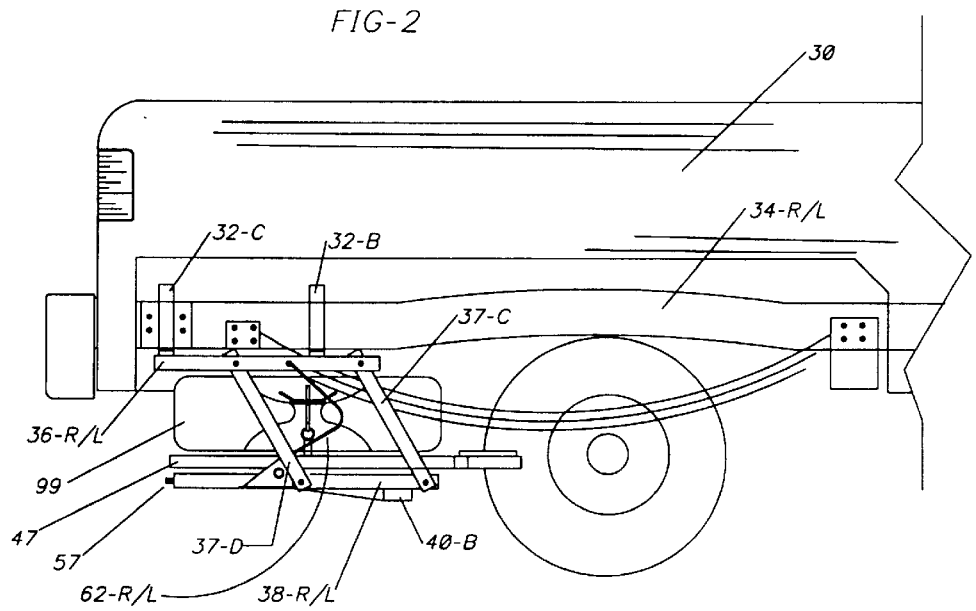

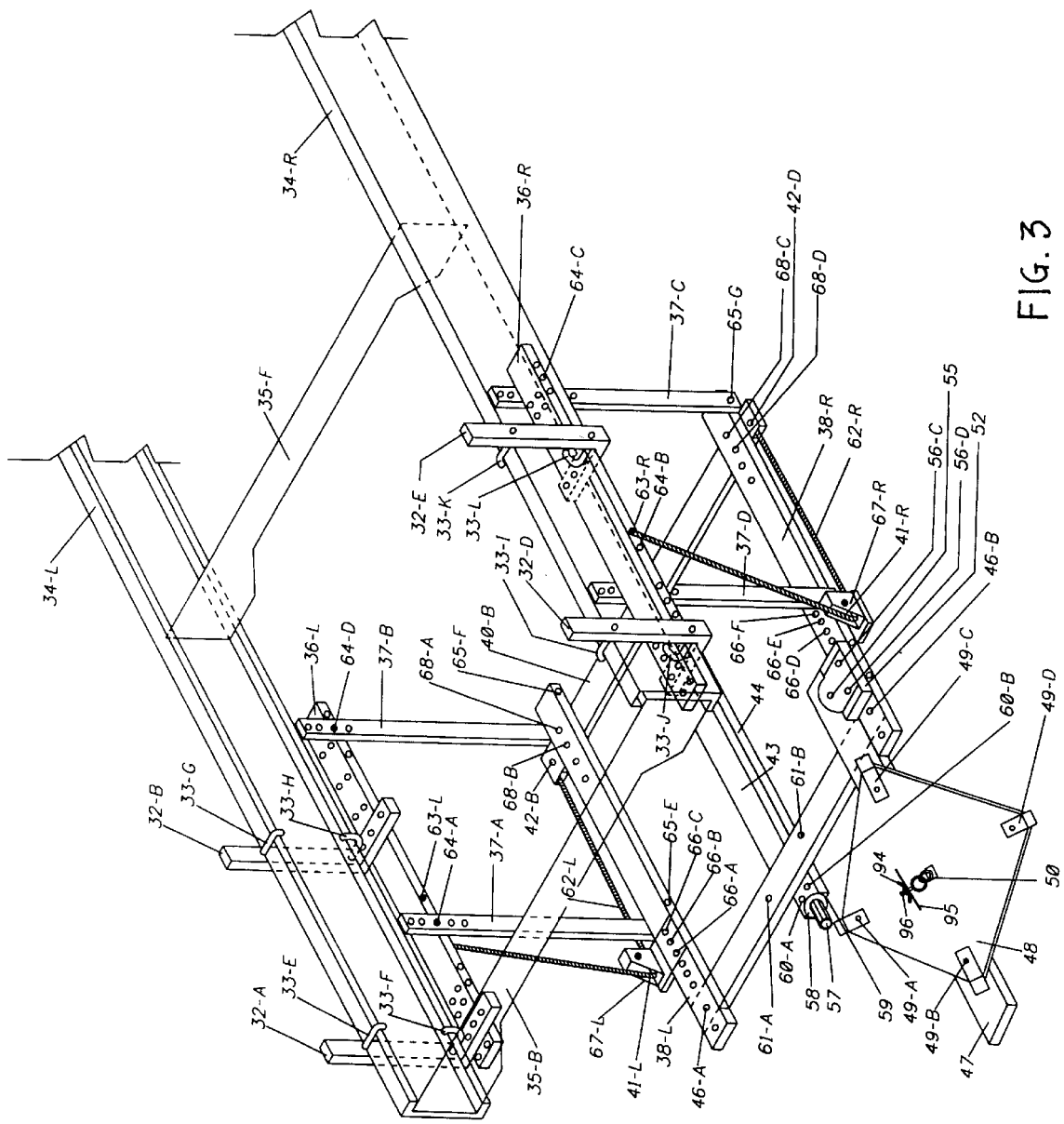

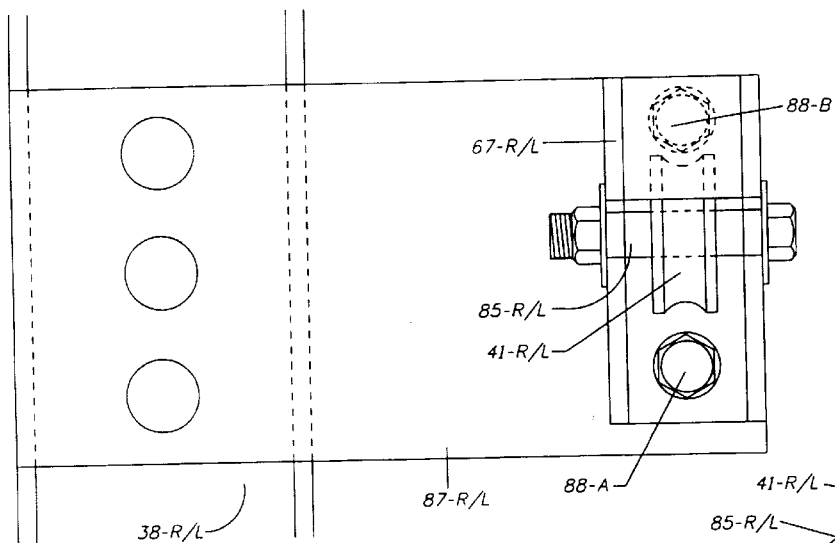
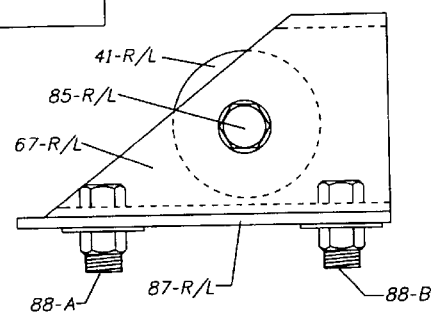
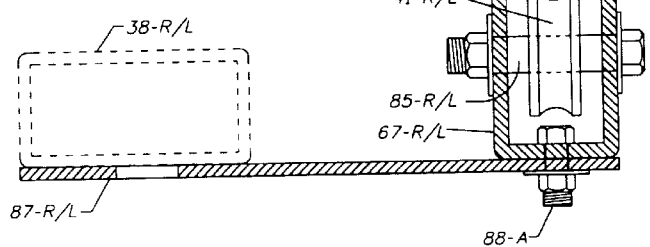

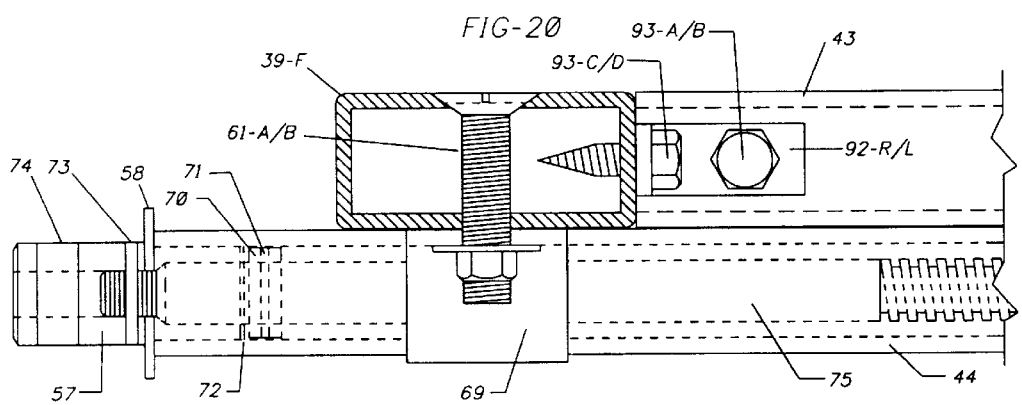

RETRACTABLE SPARE TIRE CARRIER

SPECIFICATION

1. Field of the Invention

This invention relates specifically to an improved spare tire carrier for those vehicles having a spare tire carried in a horizontal position, up against the rear underframe of the vehicle, where space has been provided, or where space might be provided.

2. Description of the Prior Art

For light duty vehicles, pick-up trucks, vans, and some utility vehicles, automobile manufacturers have traditionally supplied spare tires carried on a variety of carriers. Of these carriers furnished by the manufacturers, one of four types is generally installed as factory equipment, depending on the type vehicle, and the company's choice.

For some vans and recreational vehicles, the spare is carried in a tire well inside the vehicle, while for others the spare tire and wheel assembly is bolted to a carrier frame attached outside to one of the rear doors. Either of these types require the user to lift the assembled tire and wheel at least waist high to deposit it into the well, or to place it onto a rack attached to the rear door, to be secured.

The third type, usually for pick-up trucks, consists of a cross-bar under the truck reaching transversely across the vehicle's frame with the spare tire assembly attached to it. The far end of the cross-bar is permanently hinged to one of the vehicle's longitudinal frame members, and the near end is equipped with a latch and takeup bolt. To place the tire in storage, position, the operator, under the vehicle, mounts the tire onto the cross-bar, then raises the near end of the cross-bar to a height to engage the latch, after which he tightens the takeup bolt to secure the spare tire tightly against the undercarraige of the vehicle. To retrieve the tire for use or servicing, the foregoing steps are performed in reverse order.

Either into or out of storage, this system requires considerable physical strength, is dirty, and involves some danger, especially if the vehicle has been jacked up. There is the usual hardship and frustration when threaded parts of the system become corroded and resist efforts to move them. Monitoring spare tire air pressure is also often neglected.

The fourth type commonly supplied by manufacturers utilizes a winch fastened to the underside of the vehicle, having a cable holding the spare tire assembly up against the underframe while in storage position. When the spare tire is required, the winch cable is unwound which lowers the tire assembly to the ground, where the operator has access to uncouple or couple a tire assembly to the cable to be hoisted back up to storage position.

Obviously there is less physical strength required to install or retrieve a tire assembly by this system than those previously discussed, but the operator is still required to be under the vehicle to couple or uncouple the cable. Probably the most serious drawback associated with this system is the liability for damage should the tire assembly suddenly drop free while traveling. The sole support for the tire and wheel, is a single strand of cable. If for any reason, the winch should malfunction, the cable should break, or the "cable to wheel" coupling fail or malfunction, the wheel and tire assembly is immediately separated from the vehicle, and becomes an uncontrolled hazard to any traffic following the vehicle, or in an area surrounding the incident, for example; fast moving freeway traffic, confined tunnel traffic, on bridges, etc.

A variety of other carriers have been developed and patented, but these four are those most currently furnished by automobile producers. Many vehicle owners, not satisfied with the factory issued carriers, have improvised "home made" versions ranging from vertical mounts against the inside wall of a pick-up bed, to carrier mounts fastened to the top of the vehicle cab or onto the front bumper, and some just carry the spare loose in the bed of the truck. Most, if not all of these systems require the spare tire to be lifted to its storage position. This lifting requirement is often an extreme hardship for the handicapped, the elderly, and for many women.

In view of the shortcomings of the various types of carriers currently in use, it would be desirable to have a carrier that does not require an operator to lift a spare tire assembly into a well, or onto a rack. One that does not require a user to endure the dirt and danger of having to crawl under a vehicle to uncouple or couple a cable, or to mount or dismount a tire assembly from a cross-bar in order to access a tire for use, or return it to its storage position. A carrier that requires no lifting by the user other than to tip a tire assembly from a horizontal position up to a vertical position, or to lay a tire assembly down from a vertical position to a horizontal position.

Another object of this invention is to provide a spare tire carrier that does not rely solely on the long term integrety of a single cable, or the performance of a "cable to wheel" coupling, by which the failure of either component would cause the instant separation of the tire assembly from a moving vehicle into the path of following or surrounding traffic. Rather, a carrier that provides optimum protection against the separation of a tire and wheel assembly, and the liability for direct or collateral damages resulting from such an incident. One so designed that the failure of no one single part would cause a separation, but would require the simultaneous failure of two or more parts before an assembly could separate.

In addition to the objects and advantages described in the foregoing text, there are other favorable aspects of this concept for a spare carrier, some of which are:

Most of the vital moving parts are enclosed inside of components made from tubing, and are reasonably protected from corrosion, and from incidental road hazard damage.

None of the materials, or the processing of them have negative effects on the environment.

The simplicity in operation of this carrier makes regularly scheduled monitering of the spare tire more convenient.

The system does not rely on an inflated spare tire to insure that the assembly is held tightly against the vehicle's underside. Spare tires having become loose due to deflation, may very well undergo winch cable fatigue due to movement. This system allows for the free exchange from standard wheels furnished by the factory to custom wheels, without concern for any mismatch of the hub hole in the custom wheel, with the standard "cable to wheel" coupling used in the winch systems. A mismatch might well cause a malfunction of the coupling, and separation of the spare tire from the vehicle.

Materials for the carrier are readily available.

By this system, and without the requirement to be under the vehicle, the operator need not be too concerned for ground conditions, water, snow, hot pavement, etc.

Installation of this system requires little if any modification to those vehicles currently in use, and it would be simple to incorporate the concept into new vehicle design.

The two cables involved in this carrier's design have a combined working load capacity several times greater than that of the single cable in the current winch and cable models.

If for any reason both cables should fail at the same time on this carrier, the tire carrier base frame, with the spare tire attached would simply swing backward and downward to some four to six inches ground clearance, still intact, and still securely attached to the vehicle until an emergency stop could be made.

Another object of this invention is to provide a carrier which when retracted, stores the tire securely against the underframe of the vehicle, and when extended, presents the spare tire to the user in a horizontal position, clear of the rear of the vehicle, a few inches clear of the ground surface, and ready for use, or to be serviced.

These as well as other aspects and advantages may be recognized by a fuller understanding of the mechanisms employed to make this invention function.

This invention is a retractable spare tire carrier apparatus which is accessable from the rear of a vehicle. FIG. 1 shows a carrier in a fully extended position with the tire and wheel assembly mounted, ready to be removed for service, or to be retracted to its storage position, and held snugly against a vehicle's undercarraige as shown in FIG. 2. It consists of two stationary carrier support members attached to the longitudinal frame members at the rear of a vehicle, and from which is suspended a rectangular tire carrier base frame, using four suspension bars having pivotal connections at each end.

Said carrier base frame is made of rectangular tubing, and has a horizontal pivotal mounting installed in the near right hand corner, which is suitable to receive the pivot end connection at the first end of a cantilever arm. The second end of said cantilever arm has a base plate attached, which is suitable to receive a spare tire and wheel assembly.

With said carrier base frame suspended by said four suspension bars some four inches from the ground surface, it is free to move forward and upward in an arc, governed by the length of said four bars, to its storage position, or, backward and down to its lower position. The pivotally mounted cantilever arm as well, is free to be moved manually in a horizontal arc some one hundred twenty five degrees from its fully extended position, in longitudinal alignment with said vehicle, to a position directly over said carrier base frame, ready to be retracted up to its storage position.

The driver components to effect this carrier extension or retraction, consists of two vertical pulleys in suitable mountings, one each located at appropriate locations on the longitudinal members of said base frame. Four horizontal pulleys located one at each end, and two spaced approximately one inch apart at the center point of the back transverse member of said base frame. A driver tube made of rectangular tubing is installed, reaching from said back transverse member, and under the front transverse member, to a length two to three inches beyond said member. Inside of said driver tube is a threaded drive screw, with suitable bushings and retainers, and reaching some seventy five percent of the length of the said drive tube. A threaded nut having female threads compatable with those of said drive screw, is fitted to move easily inside said drive tube, so that when said screw is rotated clockwise, said nut moves toward the rear of the vehicle. Counter-clockwise rotation moves said nut toward the front of said vehicle.

Two smaller holes are drilled through said rectangular nut, one on each side of the threaded hole to receive two flexible cables. Said cables are of predetermined but equal length, each having a straight ferrule on one end, and the other end left plain. Both have a washer, a short coil spring, and a second washer passed over the plain end, and moved the length of said cable to said ferrule. The plain ends are then passed through the two smaller holes in the rectangular nut inside the drive tube, then around the two center horizontal pulleys, one right and one left side, through the tubular back transverse member and around the horizontal pulleys at the ends of said member. Both are then pulled back and around the two vertical pulleys, and drawn upward to cable dead end anchors located on the stationary carrier support members. Said dead end anchors have some adjustment, and said cables should be secured tight when said carrier base frame is in its fully extended position.

At this point, the reach of said cables from said verticle pulleys to said anchors will be at their greatest length, and said rectangular nut should be close to the far end of said drive screw. When said drive screw is rotated clockwise, said rectangular nut moves toward the operator, drawing cable into said driver tube. The reach of cable between said verticle pulleys and dead ends is shortened, moving said carrier base frame, and spare tire forward and upward into its storage position, FIG. 2. Counter-clockwise rotation moves said rectangular nut away from the operator, cable is payed out allowing the weight of said carrier base frame and the wheel and tire assembly to move them downward, and backward to the desired ground surface clearance, ready for the cantilever arm, and spare tire assembly to be moved in a horizontal arc to the fullest extended position, FIG. 1. Here the spare is available, clear of the vehicle, to be removed, or be re-installed on the cantilever arm.

DESCRIPTIONS OF DRAWINGS

FIG. 1 is a profile view of the carrier mounted on a vehicle in its extended position.

FIG. 2 is a profile view of the mounted carrier in its retracted position.

FIG. 3 is a perspective view of the carrier in its extended position, and attached to a vehicle's longitudinal frame members.

FIG. 17 is a plan view of the vertical outrigger pulley bracket and mounting plate attachment to the right and left hand longitudinal members of the carrier base frame.

FIG. 18 is a section drawing in profile of the outrigger pulley and base plate.

FIG. 19 is an end view of the outrigger pulley and base plate.

FIG. 20 is a side view showing the driver tube mounted on the underside of the front transverse member of the carrier base frame, and the filler tube mounted on the top surface of the driver tube.

FIG. 21 is an end view of the driver tube, and the filler tube shown from the back side of the front transverse member of the carrier base frame, 39-F.

DETAILED DESCRIPTION OF THE INVENTION

FIGS. 1 & 2 Show the tire carrier in its extended, and retracted modes. While all of the components, working together, are essential to a smooth performance of this concept, for purposes of structural description, they are grouped into three segments:

1. Attaching the tire carrier base frame to the vehicle's undercarriage.
2. Structure and suspension of the carrier base frame and cantilever arm.
3. Carrier extension and retraction drive mechanism.

Figure 4:
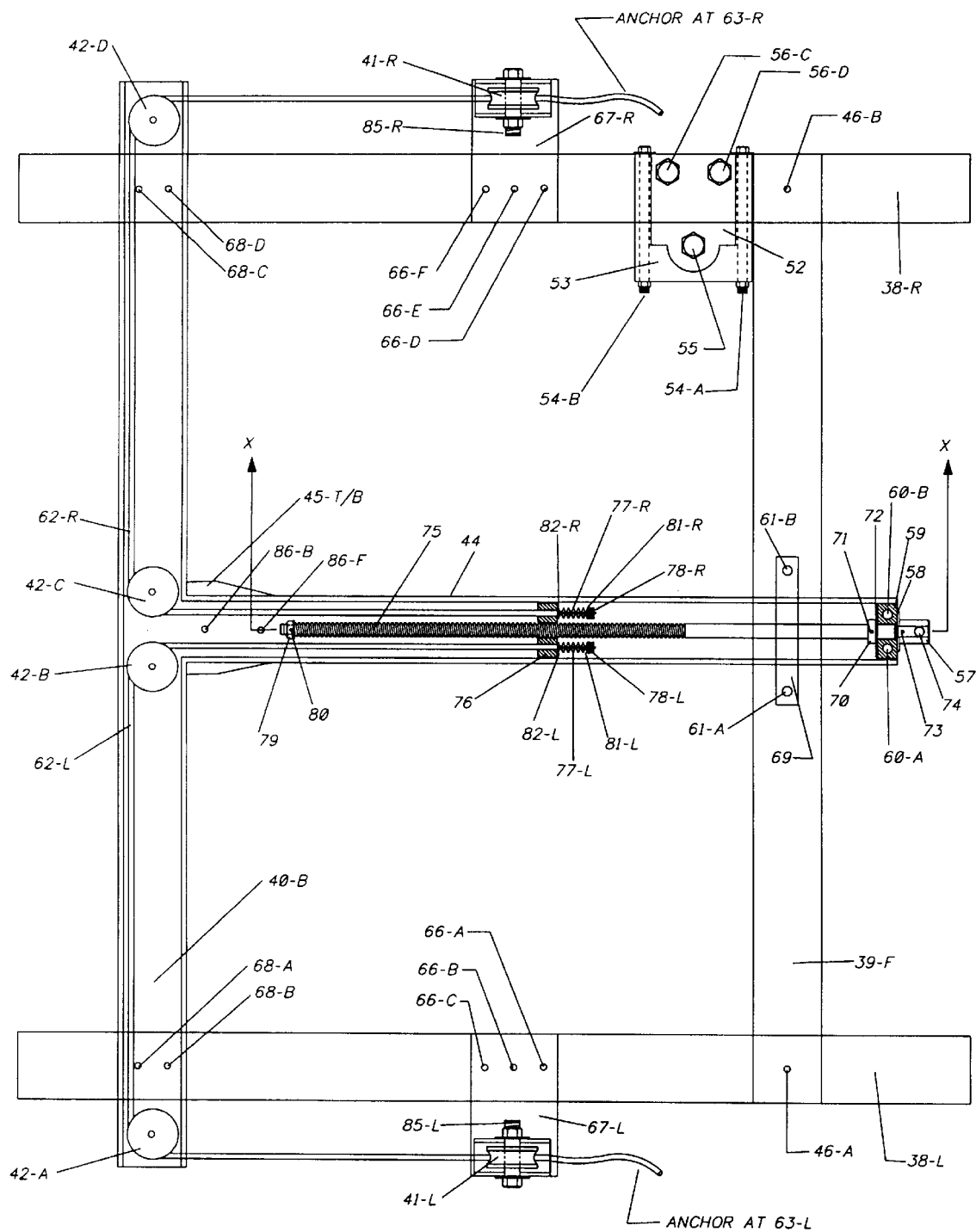
FIG. 4 is a plan view of the carrier base frame, the cable and pulley arrangement, and the driver tube.
Figure 5:
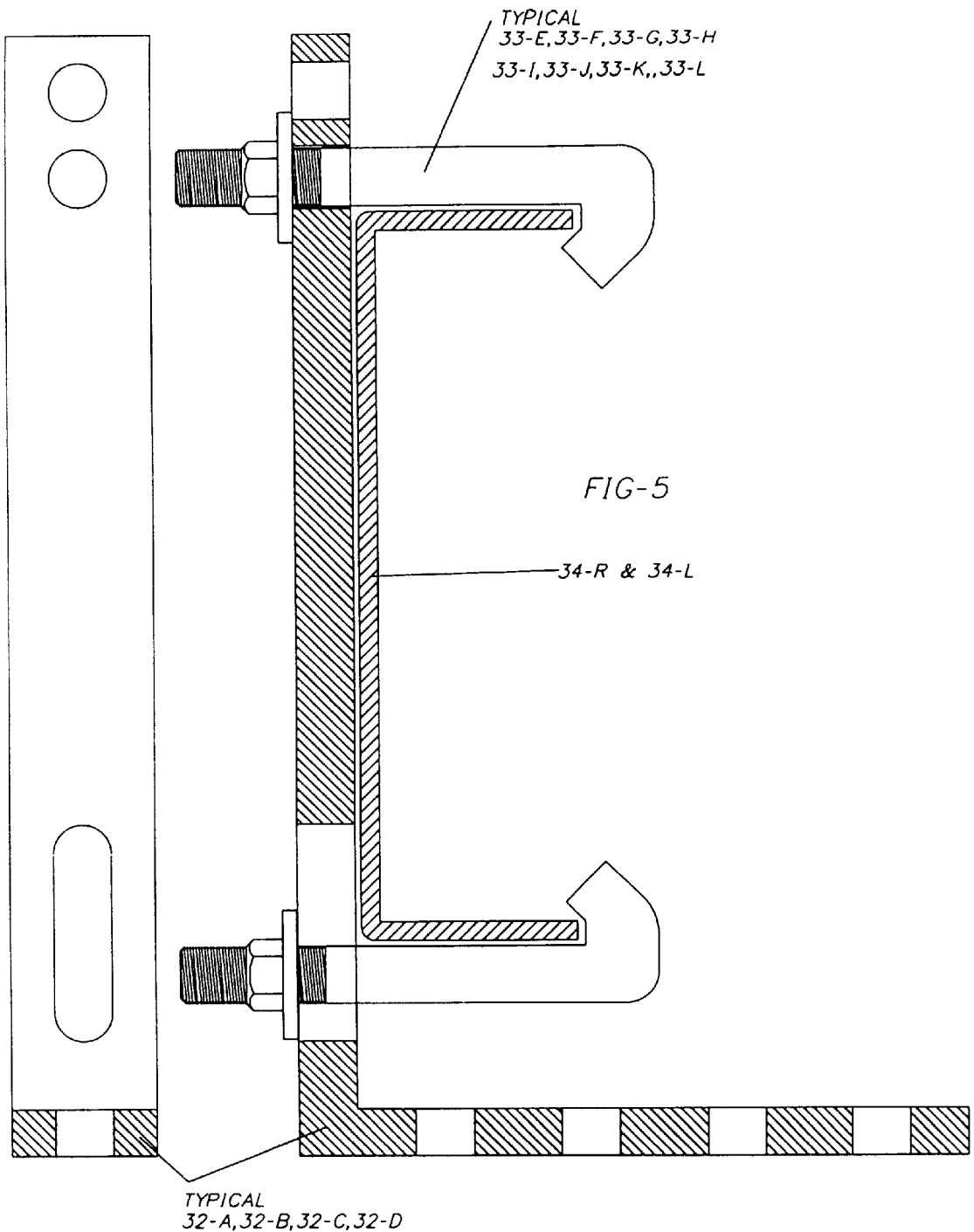
FIG. 5 shows the details for attaching the carrier support mounting angles to a vehicle's frame members.
Figure 6:
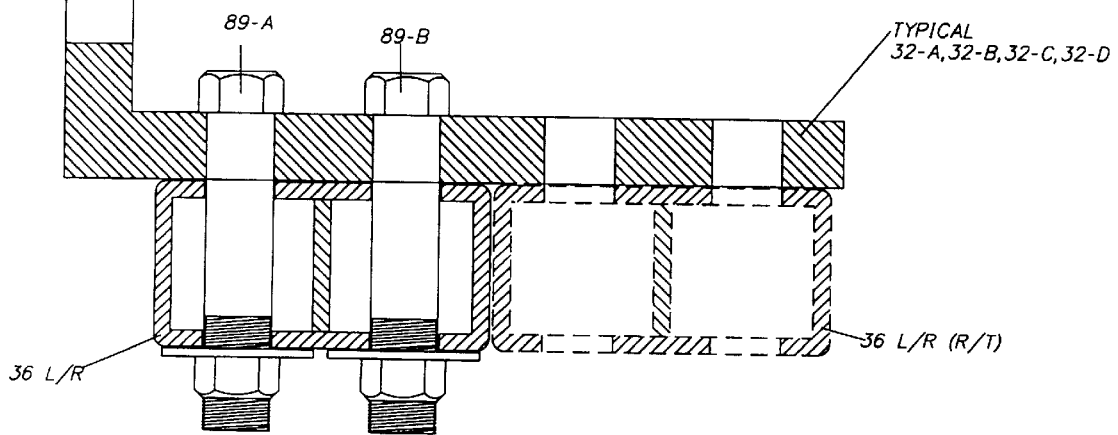
FIG. 6 shows the details for attaching the carrier support members to the mounting angle irons.
Figure 7:
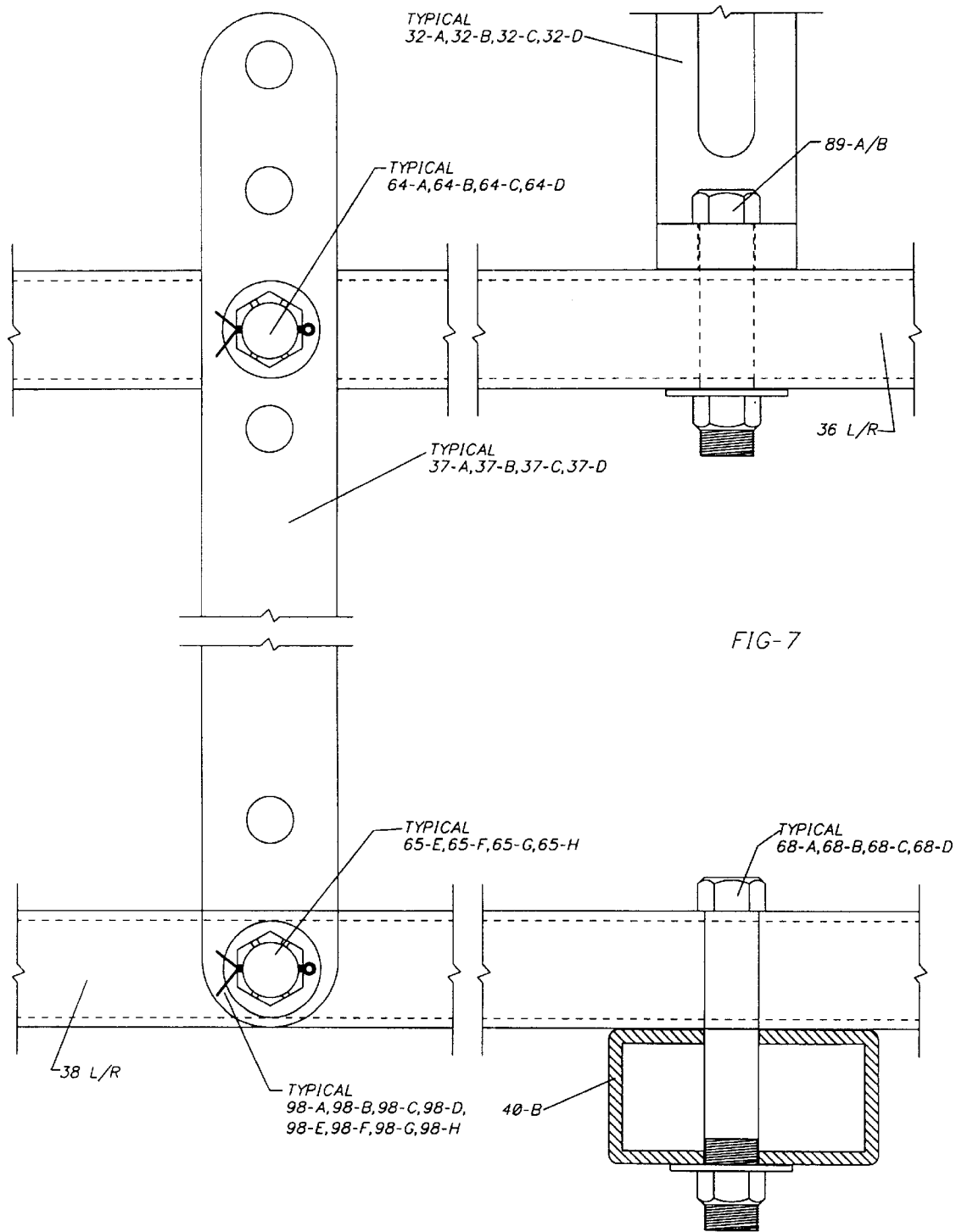
FIG. 7 is a side view showing the suspension bar connection between the carrier support members, and the tire carrier base frame.
Figure 8:
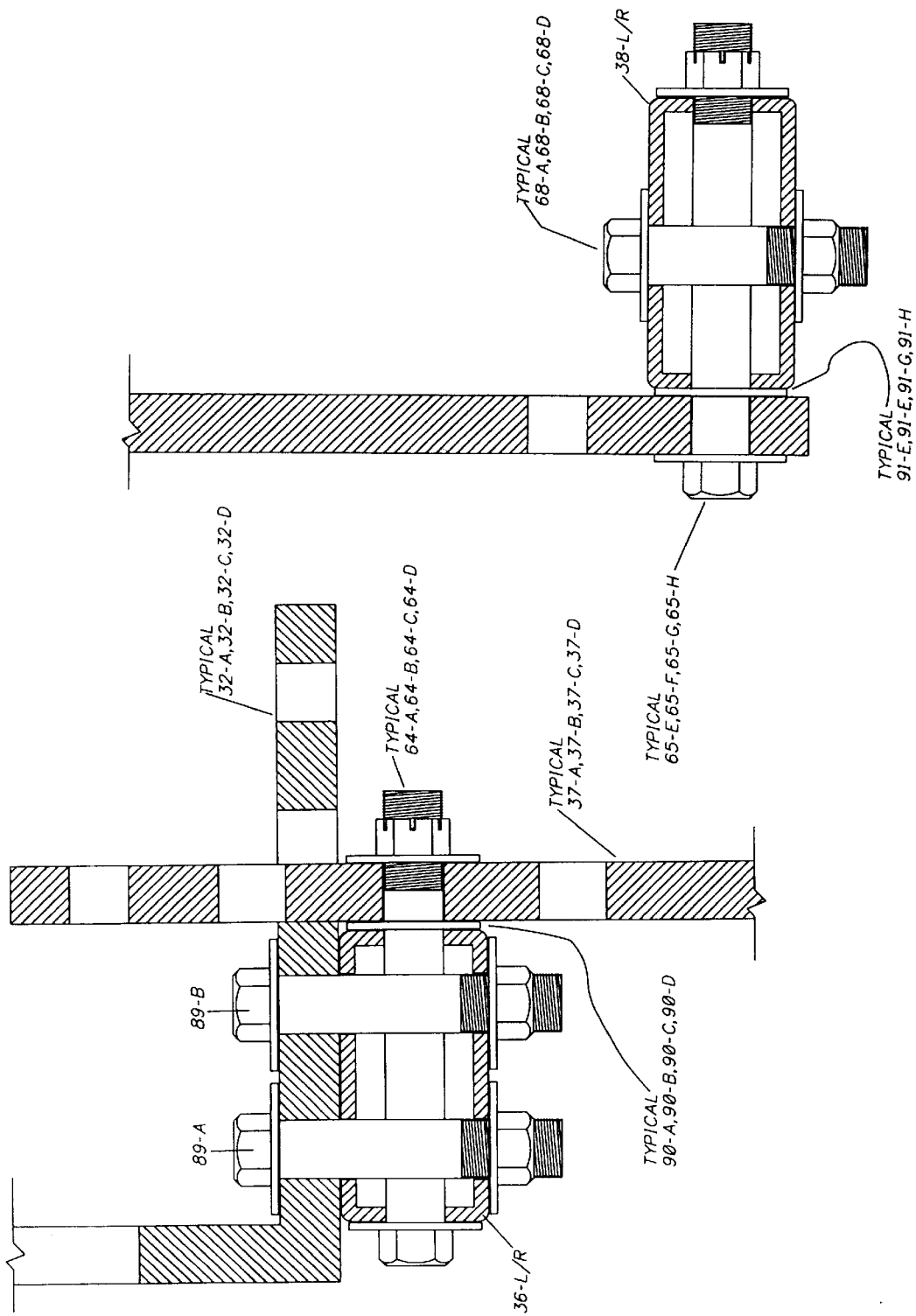
FIG. 8 is a section drawing showing the suspension bar connection between the carrier support members, and the tire carrier base frame.

FIG. 3; Attaching the tire carrier base frame to the vehicle's undercarriage consists of two carrier support members 36-L & 36-R, each attached to the vehicle's longitudinal frame members 34-L & 34-R, using four angle brackets 32-A through 32-D, two for each support member, and eight "J" bolts, 33-E through 33-L, two each per angle bracket, 32-A through 32-D. The carrier support members 36-L & 36-R are then bolted to the underside of the horizontal leg of the angle brackets, as shown by FIG. 6, for the typical attachment of the angle brackets to the carrier support member, 36-L/R, & 36-L&R (alternate) attachment. The near end of the support members 36-L & 36-R should be located within an inch or two inside the rear transverse member 35-B of the vehicle's underframe. Attached to the inboard edge of the support members 36-L & 36-R are four suspension bars, 37-A through 37-D. These suspension bars, appropriately spaced on the support members 36-L & 36-R are pivotally attached, and hang vertically to be pivotally attached to the longitudinal members 38-L & 38-R of the tire carrier base frame, as shown by FIG. 7 & FIG. 8.

Figure 9:
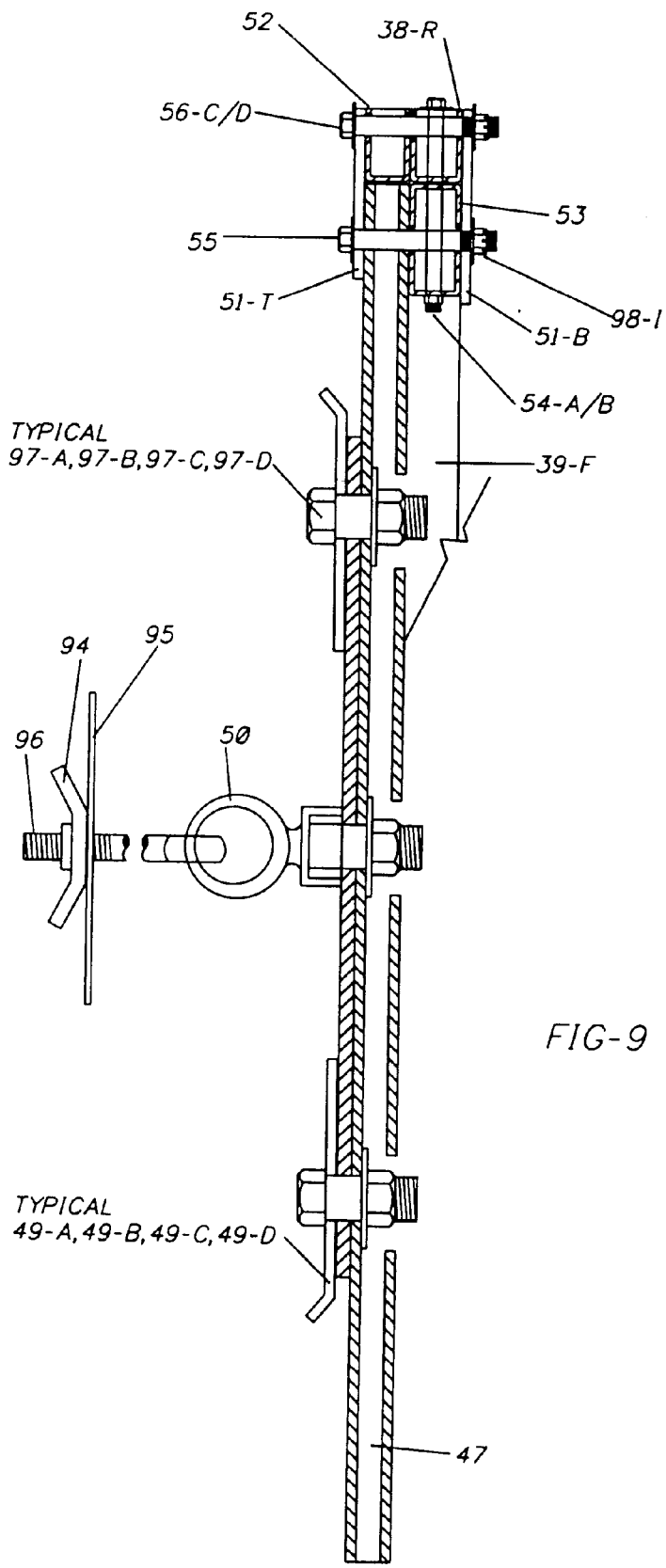
FIG. 9 is a section drawing of the cantilever arm.
Figure 10:
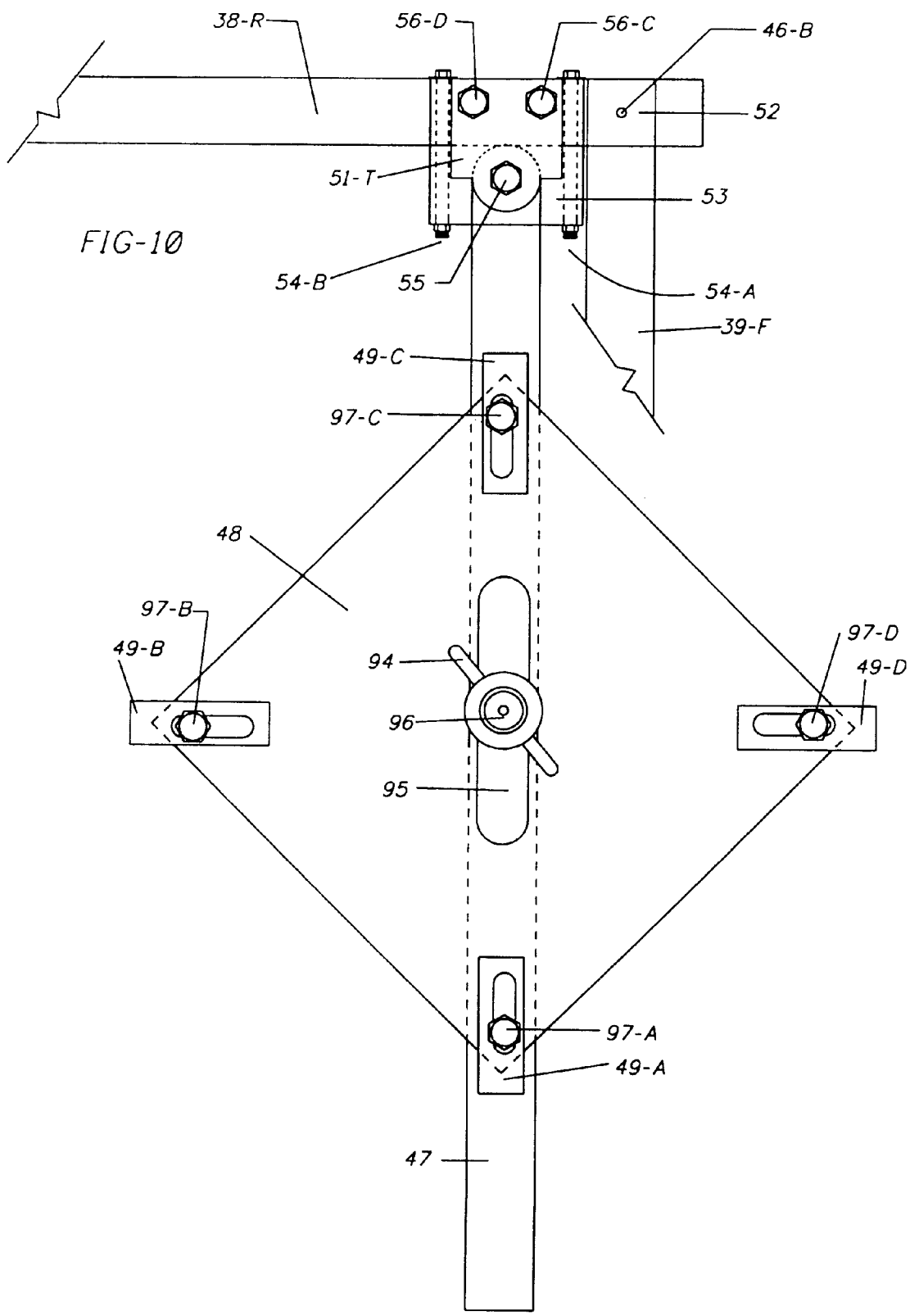
FIG. 10 is a plan view of the cantilever arm.

The tire carrier base frame, made of rectangular tubing, consists of two longitudinal members, 38-L & 38-R, and two transverse members front and back, 39-F & 40-B. These four members form a rectangle having a front to back dimension close to, but not exceeding the diameter of a spare tire. The side to side dimension is equal to the inside measurement between the carrier support members, 36-R & 36-L, minus one inch. The back transverse member, 40-B, is cut to extend beyond the outer width dimension of the two longitudinal members, 38-R & 38-L, some two inches on each side. Said member is fastened to the underside of the longitudinal members 38-R & 38-L, allowing some two inches of said longitudinal members, 38-R & 38-L to extend beyond the back edge of said back transverse member, 40-B, some two inches. The front transverse member, 39-F, is cut to fit between the two longitudinal members, 38-R & 38-L, of the carrier base frame, and is installed, using mortise and tenon connections, so that the top surface of the longitudinal members 38-R & 38-L, are flush with the top surface of said front transverse member 39-F. Said front transverse member is also set back from the front end of said longitudinals some two inches. Inside the carrier base frame rectangle, and set inside the near right hand corner, is a pivotal mounting for a cantilever arm which supports the wheel and tire assembly, 99, when the carrier is fully extended. This mounting consists of a short piece of the tubing, FIG. 9, 53, of some four to five inches fastened with bolts 54-A & B, horizontally to the inside edge, and in the same plane as the longitudinal member 38-R. A similar piece of tubing, FIG. 9, 52, for a filler piece, is cut for the top surface of the longitudinal 38-R. Two flat plates FIG. 9, 51T & 51-B, having a length equal to the that of the two pieces of tubing, and a width equal to the combined width of said longitudinal 38-R, and said short piece of tubing 53, are fastened with bolts, FIG. 9, 56-C & 56-D, passing through the top plate, 51-T, the filler piece, 52, the longitudinal member, 38-R, and the bottom plate 51-B. A bolt also passing through said plates, and through the companion piece of tubing, 53, becomes the pivot bolt, FIG. 9, 55 which allows the cantilever arm to swing backward, clear of the rear bumper, or forward in an arc some one hundred and twenty five degrees so that a spare tire mounted on said cantilever arm is positioned horizontally, directly over the spare tire carrier base frame, some four inches clear of the ground surface, ready to be raised to storage position. A cantilever arm FIG. 9, 47, consists of a section of rectangular tubing, cut to a length a few inches short of that of the carrier frame front transverse member 39-F. Said tubing having a first end shaped to a half circle with a radius half the width of said tubing, and with a hole for the pivot bolt bored through at the centerpoint of said radius. At the second end of said cantilever arm, 47, a spare wheel base plate, 48, is cut to fit inside of the outer lip of a spare wheel, 99, and is bolted to the arm, 47, so that the dimension from the center of said plate, 49, to the center of the pivot bolt, 55 is slightly less than half the length of the front transverse member, 39-F. Attached to said plate at several points on its perimeter are adjustable metal to metal contact points, 49-A through 49-D which engage the rim of wheel, 99, just inside the outer lip. An eye-bolt, 50, is securely fastened at the center of said base plate 48, and a hook-bolt, FIG. 9, 96 with a wing-nut, FIG. 9, 94, passes through a cross-bar FIG. 9, 95, spanning the hub hole of said spare wheel, 99, engages said eye-bolt 50, so, that when said wing-nut is tight, said wheel and tire assembly 99, is held securely to said arm, whether said spare tire is inflated or not. Said back transverse member, 40-B, of the base frame, has an opening with the same dimensions as the end section of the tubing, cut from the front edge of the member, at the midpoint of its length. On centerline of the top width of this member 40-B two bolt holes 84-A & 84-B are drilled approximately one and one quarter inches on either side of center line of the length of the member, and at each end at approximately one and one quarter inches from the ends of the member. At each of these hole locations, a suitable horizontal pulley is installed. At a point approximately two thirds of the length from the far end of both base frame longitudinal members 36-R & 36-L, a vertical outrigger pulley 41-R & 41-L, is installed, consisting of two flat plate mountings, 86-R & 86-L, some five inches by three inches, with a pulley mounted in a bracket across a three inch end of each plate and at right angles to the plane of the plates FIG. 17 87-R & 87-L. This mounting, when fastened to the underside of said carrier base frame longitudinals 38-R & 38-L, with the second three inch end flush with the inner edge of said longitudinal members, fixes said vertical pulleys 41-R & 41-L in their proper locations, so that they extend some two inches outside said longitudinal frame members 38-R & 38-L, and in vertical alignment with the outer edge of the stationary carrier support members 36-R & 36-L attached to the vehicle's underframe.

Figure 11:
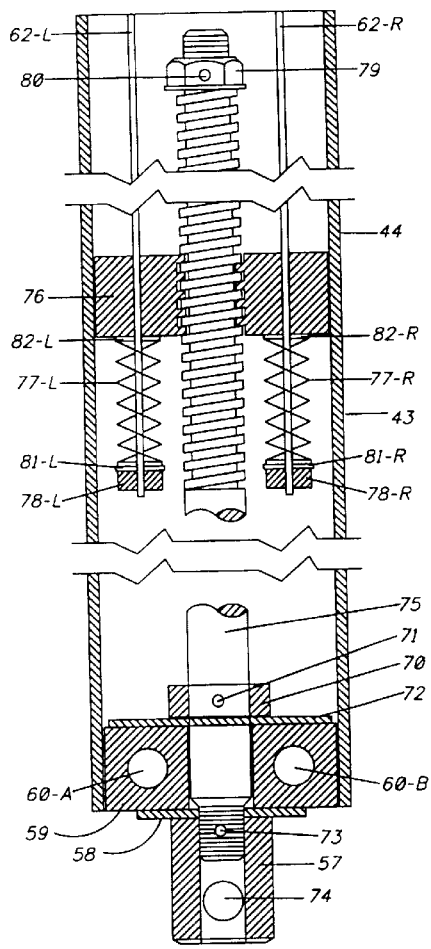
FIG. 11 is a detailed sectional drawing taken along the cross section line X—X, of FIG. 3.
Figure 14:
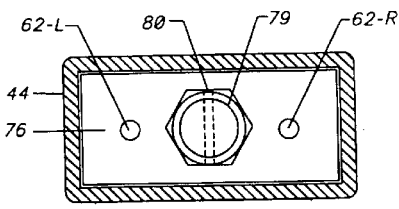
FIG. 14 is a cross section of the far end of line X—X, FIG. 11.
Figure 13:
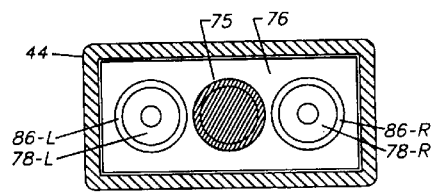
FIG. 13 is a cross section of the intermediate part of line X—X, FIG. 11.
Figure 12:
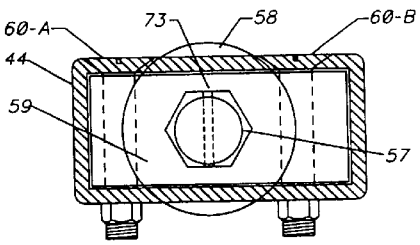
FIG. 12 is a cross section of the near end of line X—X, FIG. 11.
Figure 16:
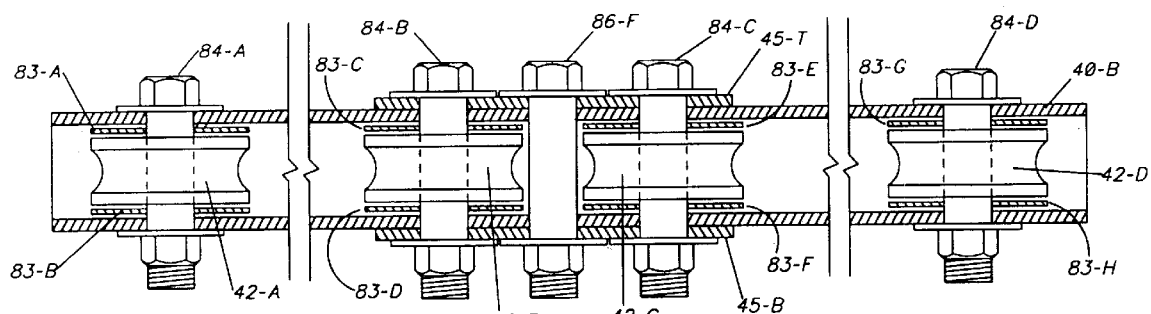
FIG. 16 is a cross section of the pulley arrangement in the back transverse member, 40-B, of the carrier base frame FIG. 3.
Figure 15:
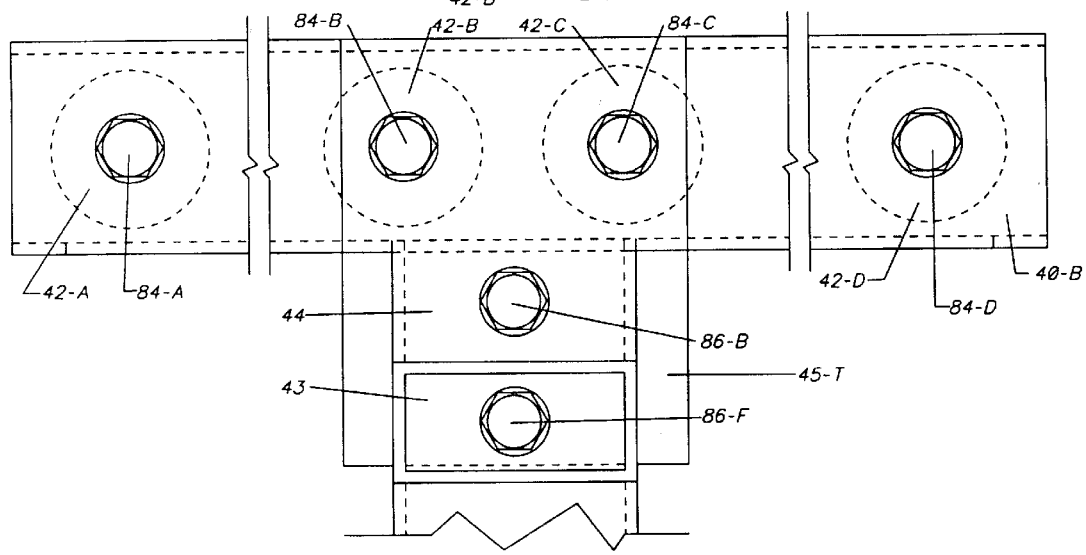
FIG. 15 is a plan view of the pulley arrangement in the back transverse member, 40-B, of the carrier base frame, FIG. 3.

The drive mechanism which effects the extension or retraction of this carrier involves an arrangement of cables and pulleys, combined with a drive screw, and a movable nut, inside a rectangular driver tube 44, which is incorporated into the carrier base frame. Said driver tube is cut to reach from the inside edge of said back transverse member 40-B, to a length extending some three inches past, and under the front transverse member 39-F. It is secured in place having the far end covering the opening in the front edge of member 40-B using top and bottom splice plates, FIG. 15, 45-T & 45-B, approximately three by five inches, and drilled to utilize the pulley shaft bolts, 84-B & 84-C at the center of the back frame member, 40-B, and two bolts, 86-B & 86-F, installed on centerline through the driver tube. The near side is secured at the midpoint, and on the underside of the front transverse member, 39-F, using a hanger type bracket, 69, bolted through said front transverse member, 39-F, using flat head bolts, 61-A & 61-B. To provide support for the cantilever arm, 47, when the tire is in storage position, a surface filler tube, 43 is installed on the top surface of the driver tube 44. It is cut to reach from the back edge of the front transverse member, 39-F, to the first of the two bolts, 86-F, through the driver tube, 44, and the splice plates, 45-T & 45-B, joining the back transverse member, 40-B, with the driver tube, 44, The far end of said filler tube, 43, is drilled and secured using that bolt, 86-F. The near end is secured using two short angle brackets, 92-R & 92-L, FIG. 21, at the edges of said filler tube, 43, and the back edge of the front transverse member, 39-F. Said angle brackets are held fast, using sheet metal bolts 92-A through 92-D, FIG. 21. The activating mechanism inside the driver tube, 44, consists of a drive screw, 75, FIG. 11, having a length to reach from the near end of said driver tube, 44, to a point approximately three inches short of the first splice plate bolt, 86-F. The far end has a reduced diameter, is threaded, and has a standard hex nut, 79, FIG. 11, which is secured by a roll pin, 80, FIG. 11, installed through the nut 79, FIG. 11, and the end of the shaft, 75, FIG. 11. The near end also has a reduced diameter, and is threaded with standard threads. The shaft 75, FIG. 11 is full diameter for some six inches away from the near end, but from that point to the far end, the shaft is threaded with an "Acme" type thread, having a pitch of some five threads per inch. A rectangular nut 76 FIG. 11, approximately one inch thick, having a thread matching that of said screw, and said nut, shaped to fit loosely inside the driver tube 44, is installed on said drive screw 75 FIG. 11, prior to installing the standard nut 79 on the far end of said drive screw. Said rectangular nut 76 FIG. 11, has two quarter inch holes drilled parallel to the threaded center hole, and at midpoint between the end of said nut, and the threaded center hole 62-R & 62-L, FIG. 14. The near end of the driver tube 44 has a rectangular bushing 59 FIG. 12, approximately one inch thick, with a center hole bored to the diameter of the smooth section of the drive screw shaft 75. Said bushing is installed in the driver tube 44, and is held in place by two vertical bolts 60-A & 60-B FIG. 12, installed through both tube walls, and said bushing 59 FIG. 12, and with the near side of said bushing flush with the end of the driver tube 44. On the shaft of the drive screw 75, against the far side of the bushing 59 FIG. 11, is a thin wear plate 72 FIG. 11. Against the wear plate, is a collar 70 FIG. 11, which is secured in place using a roll pin 73. Location of said collar 78 on said shaft 75, should place the shoulder of the shaft's reduced section slightly inside the near side of the bushing 59 FIG. 11. On said shaft 75 against the near side of said bushing 59, is a thrust washer 58 FIG. 11. Installed on the threaded end of said shaft 75, is an extra length hex splicing nut 57, FIG. 11. After adjusting said nut 57 for end-play of the shaft 75, it is also secured with a roll pin, 73. Just clear of the near end of the threaded shaft, a second larger hole 74 FIG. 11 is drilled through splice nut 57 FIG. 11, to allow for an optional means of rotating said shaft 75. Clockwise rotation of the drive screw 75, moves the rectangular nut 76 FIG. 11, inside said tube 44, toward the operator. Counter-clockwise rotation moves said rectangular nut 76 in the opposite direction away from the operator. With the rectangular nut 76, adjusted to within an inch of the far end of the drive screw 75, two cables of predetermined length, FIG. 11 62-R & 62-L, each having one plain end, and each having a straight ferrule on the other end, FIG. 11 78-R & 78-L, are passed from back to front through the two smaller holes in said rectangular nut FIG. 11 76. Prior to this step, each cable has a washer FIG. 11 81-R & 81-L, bearing against said ferrule, a short coiled compression spring FIG. 11 77-R & 77-L, and a second washer FIG. 11 82-R & 82-L, bearing against the operator side of said rectangular nut FIG. 11 76. This feature provides a resilient link in the system to relieve shock loading on the cables FIG. 11 62-R & 62-L. Inside said driver tube 44, and transverse member 40-B, said cables 62-R & 62-L are passed on each side of the splice plate bolts 86-B & 86-F, around each of said horizontal pulleys 42-B & 42-C at the center of transverse member 40-B, then through said tubular member 40-B and around said horizontal pulleys 42-A & 42-D at the ends of said member 40-B. Said cables are then drawn back and passed around the two vertical outrigger pulleys 41-R & 41-L. At this point, with said carrier base frame clamped in its maximum lowered position, said cables 62-R & 62-L are pulled upward and tightly fastened at the dead end anchor points provided on each of the stationary carrier support members 36-R & 36-L. With the release of said carrier base frame from said clamps, said carrier becomes functional. Dimensions vary among vehicles with respect to frame section dimensions, transverse dimensions between frame members, frame to ground dimensions, etc. In order to accommodate these differences, optional bolt hole patterns have been provided for some of the component parts, specifically: Stationary carrier support members 36-R & 36-L, angle mounting brackets 32-A through 32-D, base frame suspension bars 64-A through 64-D, and carrier base frame longitudinal members 38-R & 38-L.

The foregoing descriptions contain a number of specifications which do not preclude consideration of alternate materials, or structural processing methods. For example, frameworks may be made of structural shapes other than rectangular tubing, or, some structural connections may be welded rather than bolted, etc. These descriptions represent the results of hand crafting a working prototype apparatus from materials easily available, not high-tech production line procedure. Let the merits of the invention be evaluated on its fulfillment of the claims rather than by the examples given.

While not specified as components of the invention, two suggested means are offered to rotate the drive screw from a position behind the vehicle.

1) A crank type speed wrench with a shaft extension, a universal joint, and a suitable socket to engage the hexagonal adaptor on said drive screw.

2) A crank having an extended shaft with a hook formed at the end to engage an anchor type clevis installed in said shaft adaptor's optional hole.

SUMMARY

This tire carrier apparatus utilizes a drive screw and a movable nut to manipulate the length of a reach of two cables between dead end anchors on two stationary carrier supports attached to a vehicle's frame, and two vertical pulleys attached to a suspended tire carrier base frame. Clockwise rotation shortens that reach of cable, moving said base frame forward and upward to storage position. Counter-clockwise rotation lengthens said reach of cable so that said base frame moves backward and downward to its lowest position at which point the tire and wheel assembly may be moved horizontally to its fullest extended position on a cantilever arm, ready for the tire to be dismounted or mounted.

I claim a retractable spare tire carrier apparatus featuring:

1. A spare tire carrier apparatus for attaching to longitudinal members on the underside rear portion of a vehicle, the apparatus comprising:

fastening means for attaching the apparatus at two sides on the underside rear portion of the vehicle, carrier support members connected to the fastening means at each of the two sides, a rectangular carrier base frame comprising two longitudinal members, two transverse members, a surface filler tube attached to each of the transverse members and a driver tube, attached on an underside of the surface filler tube, two suspension bars on each of the two sides, whereby one end of each of the suspension bars is pivotally connected to the carrier support member and the other end is pivotally connected to the longitudinal members of the rectangular carrier base frame, a cantilever arm containing a base plate, whereby the arm is pivotally attached by a pivot bolt to one of the longitudinal members, whereby a spare tire is directly secured to the base plate and is movable in a horizontal arc of movement from a storage position where the tire is stored in a position under the vehicle to a fully accessible position where the arm is located clear of the underside of the vehicle for access to the spare tire, and a controlled cable means for transferring the carrier base frame vertically to and from the storage position to the fully accessible position.

2. The spare tire carrier apparatus of claim 1, further providing clear access to allow the horizontal movement of the cantilever arm from the storage position to the fully accessible position manually.

3. The spare tire carrier apparatus of claim 1, whereby the controlled cable means further includes two cables of equal length with an end of each cable deployed through a rectangular nut associated with the driver tube and each cable is further connected around horizontal pulleys connected to one of the transverse members, then further connected around a vertical pulley connected to one of the longitudinal members, and finally connected to dead end anchors adjacent to a vehicle's longitudinal members.

4. The spare tire apparatus of claim 3, further comprising a drive screw within the drive tube for providing rotation for moving the carrier base frame, whereby the rectangular nut is connected to a forward end of the drive screw.

5. The spare tire apparatus of claim 1, wherein the rectangular carrier base frame, the suspension bars, and the carrier support members all have a plurality of vertical and horizontal bolt patterns to accommodate installation on a variety of vehicles.

* * * * *